United States Patent [19]
Telkes

[11] 4,010,620
[45] Mar. 8, 1977

[54] COOLING SYSTEM
[75] Inventor: Maria Telkes, Newark, Del.
[73] Assignee: University of Delaware, Newark, Del.
[22] Filed: Oct. 8, 1975
[21] Appl. No.: 620,570
[52] U.S. Cl. .......................................... 62/2; 62/4; 62/94
[51] Int. Cl.² ........................................ F25B 27/00
[58] Field of Search ............................. 62/2, 4, 94

[56] References Cited
UNITED STATES PATENTS

| | | | |
|---|---|---|---|
| 2,154,473 | 4/1939 | Schlumbohm | 62/4 |
| 2,677,243 | 5/1954 | Telkes | 62/4 X |
| 2,690,656 | 10/1954 | Cummings | 62/94 |
| 2,798,570 | 7/1957 | Kelley | 62/94 |
| 2,841,217 | 7/1958 | Goetz | 62/94 X |
| 3,232,029 | 2/1966 | Evans, Jr. | 62/94 X |

Primary Examiner—Ronald C. Capossela

[57] ABSTRACT

A cooling system for air conditioning of buildings which comprises creating a cold medium by dissolving a salt in water, said salt being characterized by forming an endothermic solution, passing air through or over said cold solution to cool the air before introduction into said building, after the potential cooling effect is exhausted the salt is recovered by evaporation of the water from the solution with hot air, said hot air being at least partly heated by solar energy.

6 Claims, 1 Drawing Figure

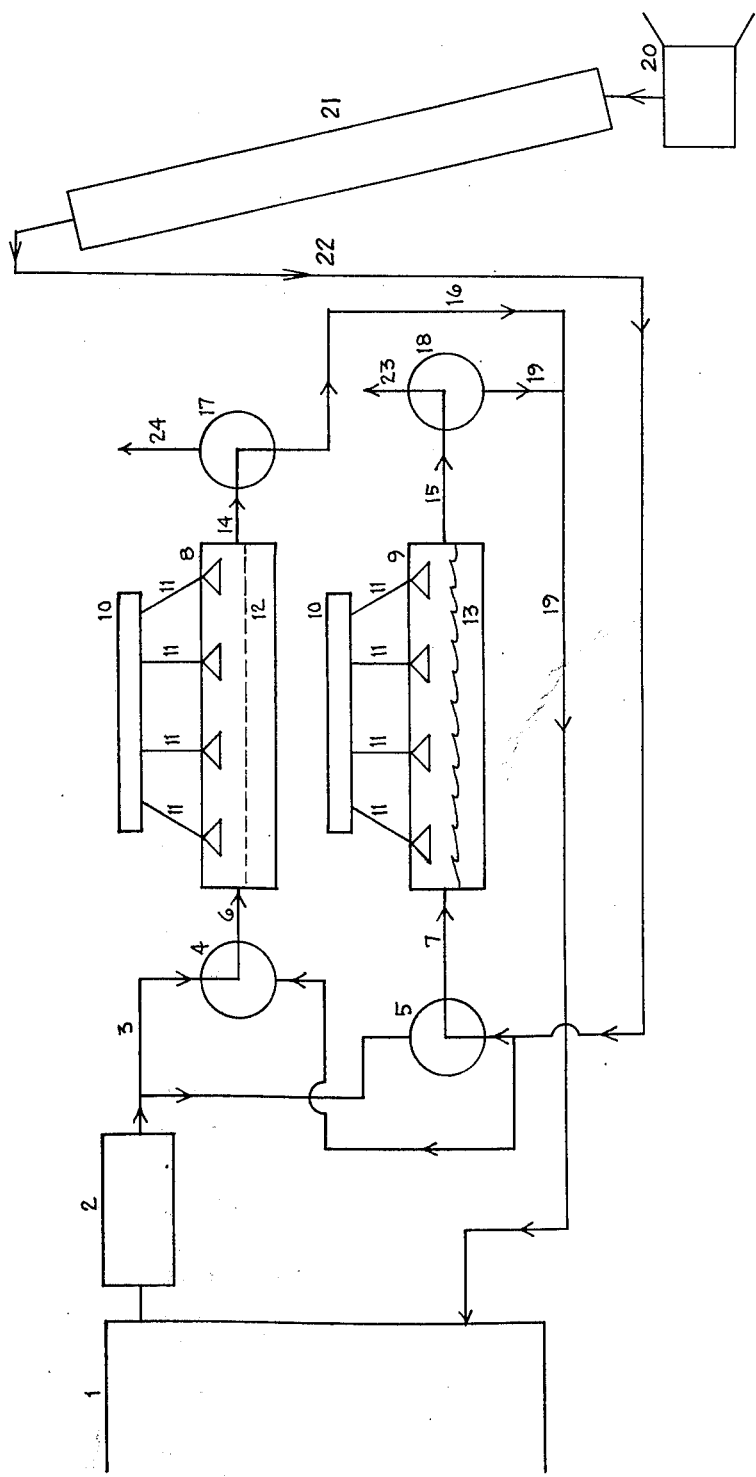

COOLING SYSTEM

This invention relates a system for using solar energy for cooling building. Refrigeration systems using solar energy to cool building space may include:
1. Compression refrigeration, operated by heat engines powered by solar thermal energy,
2. Compression refrigeration, partially or wholly operated by electric power converted from solar energy, and
3. Absorption refrigeration operating in either the continuous or intermittent mode and with various refrigerant-absorbent systems.

Other building space cooling methods involving use of solar energy but applying it less directly are in various stages of development and use. Examples are:
1. Dehumidification of air with desiccant from which moisture is then stripped by solar heat. This approach may be used to dry air in building space, and/or to dry ambient air which can then be used in an evaporative cooling system.
2. Evaporative cooling, which is especially suitable for areas having low ambient humidity. As noted above, this type of cooling may also be used with more humid ambient air by dehumidifying the air taken from the ambient supply and using the dried air to produce the evaporative cooling effect. The desiccant used for dehumidification may then be dried with solar heat.

The object of this invention is to provide a new and economically feasible system for cooling buildings operated wholly or in part with solar energy. Other objects will be obvious from the following description of the invention.

This invention provides for the cooling of buildings by means of the following method:
1. creating a cold solution by adding water to a salt or mixture of salts said salt or salts being characterized as having an endothermic heat of solution,
2. passing air over or through said solution or in contact with a heat exchanger container containing said solution in order to cool the air and warm the solution,
3. passing the cooled air into said building to cool same and
4. after the potential cooling effect is exhausted, passing heated air through or over said solution, to evaporate the water and reform the salt for reuse, said heated air being heated at least in part by solar heat.

This process for air conditioning buildings uses two or more units where the cyclic steps set forth above can be carried out. Valves in the air ducts circulating the air through the building and the cooling apparatus can be regulated so that the air is directed, in direct or indirect contact, with the cold solutions just after they are formed and out of contact during the time that evaporations of the water and reforming of the salt takes place.

The dry salts may be recovered by using solar heat either directly or from a heat storage unit for solar energy. The preferred method is to use the heat generated in external solar heat collectors located on the roof or walls of the building.

The dry compounds are dissolved, preferably in a limited quantity of water. Accordingly it is desirable to select endothermic processes which show the largest cooling effects by the dissolving of the salt or salts in the fewest moles of water. After the dry solute is dissolved in $n_w$ moles of water, the cooling is used by heat exchange. After coolness is depleted it is necessary to evaporate the same $n_w$ moles of water to regain the dry solute. While the evaporated water is "vented" it is immediately obvious that the endothermic heat of solution effect should be as high as possible per mole of water to diminish the heat required for evaporation. Neglecting the influence of vapor pressures and other effects the "coefficient of performance" (C.O.P.) must be proportional to the integral heat of solution $\Delta H$ (calories/mole of solute) and to the heat of vaporization of water (calories per $n_w$ moles of water). Table 1 contains data relating to several compounds with endothermic thermal effects during solution in variable number of moles of water. In addition to molar values, the data are expressed on a weight basis, giving the cooling effect in calories per gram dry solute (cal/g) compared to the weight of water required per gram of solute. It is highly desirable to limit the required amount of water to a fraction of the weight of dry compound.

INFLUENCE OF TEMPERATURE ON SOLUBILITY

In ideal solutions, which do not form solid solutions, the relationship of the absolute temperature T, the heat of fusion $\Delta H_f$ per mole of solute $n_s$ is given by $$\left(\frac{\Delta \ln nn_s}{T}\right)_P = \frac{\Delta H_f}{RT^2}$$

If the heat of fusion is constant within the operating temperature range, and pressure (P) is also constant (near one atmosphere), the above equation can be integrated to give:

$$\ln n_s = -\frac{\Delta H_f}{RT} + C$$

The integration constant can be evaluated for ideal solutions and solutes of $T_m$ melting points giving the result:

$$\log n_s = \frac{\Delta H_f}{4.576}\left(\frac{T - T_m}{TT_m}\right)$$

According to this equation a graphical plot of the logarithm of solubility (in mol fraction) against 1/T should be a straight line with the slope of $-\Delta H_f/4.576$. For ideal solutions the heat of solution is equal to the heat of fusion of the solid, at temperature $T_m$.

As a practical result of these calculations it is advisable to select materials with low molecular weights, and high solubilities. At the desired temperature-range of cooling operations (probably 0° to 20° C or 273° to 293° K) the straight line relationship is not appreciably distorted, even when solubility is plotted in gram anhydrous compound per 100 gram water. Materials of high solubility include $NaNO_3$ sodium nitrate, $NH_4NO_3$ ammonium nitrate, $NH_4CNS$ ammonium thiocyante, $KCNS$ potassium thiocyanate and others.

One of the promising materials is ammonium nitrate, available at low cost (used as a fertilizer).
Endothermic solution effect 81.5 cal/g.
Water required at 0° C 0.83 g
Heat of evaporation of water 0.83 × 540 cal/g = 450
"Theoretical" C.O.P. 81.5/450 = 0.18

TABLE I

THERMODYNAMIC DATA OF ENDOTHERMIC SOLUTION PROCESSES

| Material | Mol Wt. | Mols WATER | THERMAL EFFECT cal/mol | THERMAL EFFECT cal/g | WATER g Water used per g salt | WATER Cal to evaporate water(a) | coolness evaporation cal/cal "C.O.P." % |
|---|---|---|---|---|---|---|---|
| Ammonium chloride | | | | | | | |
| $NH_4Cl$ | 53.50 | 0 | 0 | | | | |
| | | 10D | 3.81 | 71.5 | 3.4 | 1,800 | 5.5 |
| | | 25 | 3.78 | 70.6 | 8.5 | 4,610 | 1.6 |
| | | 50 | 3.76 | 70.2 | 16.8 | 9,100 | 0.76 |
| | | 100 | 3.75 | 70.0 | 33.5 | 18,100 | 0.39 |
| Ammonium nitrate | | | | | | | |
| $NH_4NO_3$ | 80.05 | 0 | 0 | | | | |
| | | 3D | 3.97 | 49.6 | 0.68 | 370 | 13.4 |
| | | 4 | 4.07 | 51.0 | 0.90 | 490 | 10.4 |
| | | 5 | 4.24 | 53.0 | 1.12 | 605 | 8.8 |
| | | 10 | 4.81 | 60.0 | 2.25 | 1,250 | 4.8 |
| | | 20 | 5.32 | 66.5 | 4.50 | 2,420 | 2.7 |
| | | 50 | 5.78 | 72.5 | 11.2 | 6,050 | 1.2 |
| | | 100 | 5.97 | 75.0 | 22.4 | 12,200 | 0.6 |
| Sodium nitrate | | | | | | | |
| $NaNO_3$ | 85.01 | 0 | 0 | | | | |
| | | 6D | 3.07 | 36.1 | 1.28 | 690 | 5.2 |
| | | 7 | 3.23 | 38.0 | 1.48 | 800 | 4.8 |
| | | 10 | 3.44 | 40.5 | 2.10 | 1,130 | 3.6 |
| | | 15 | 3.73 | 44.0 | 3.20 | 1,730 | 2.5 |
| | | 25 | 4.09 | 48.1 | 5.30 | 2,860 | 1.7 |
| | | 50 | 4.52 | 53.0 | 10.6 | 5,700 | 0.9 |
| | | 75 | 4.63 | 54.5 | 15.8 | 8,500 | 0.6 |
| | | 100 | 4.71 | 55.5 | 21.0 | 11,300 | 0.5 |

D = indicates that the salt is completely dissolved.
(a) Heat related to salt crystallizing from solution and to the effect of salt on specific heat of the solution is small in comparison with heat to raise temperature and evaporate the water; it is not included in this approximation.

Other salts that can be used are sodium nitrate and potassium nitrate.

Experiments carried out using ammonium chloride indicate that this salt is also commercially practical. These experiments are summarized in Table II

TABLE II

EXPERIMENTAL RESULTS WITH $NH_4Cl$ WATER SOLUTIONS

| Material | Mol Wt. | Water Added g | Temp. Drop $\Delta T°C$ | Cooling Effect cal/g Total | g Water Used per g salt | Heat for Evaporation of water cal | C.O.P. % |
|---|---|---|---|---|---|---|---|
| $NH_4Cl$ | 53.50 | 20 | 8 | 9.6 | 0.2 | 108 | 8.8 |
| 100 g dry | | 40 | 13 | 19.2 | 0.4 | 216 | 8.8 |
| | | 60 | 15 | 24 | 0.6 | 324 | 7.3 |
| | | 80 | 16.5 | 30 | 0.8 | 432 | 7.0 |
| | | 100 | 17.5 | 35 | 1.0 | 540 | 6.6 |
| | | 120 | 18.0 | 40 | 1.2 | 650 | 6.2 |
| | | 140 | 18.5 | 45 | 1.4 | 756 | 5.9 |

Mixed salts may also be used. Solubilities of salt combinations include a mixture of ammonium chloride $NH_4Cl$+ammonium nitrate $NH_4NO_3$. The solubility of $NH_4NO_3$ at 0° C is 118 gram per 100 gram water. If $NH_4NO_3$ 156 gram is mixed with $NH_4Cl$ 30 gram, the solubility of the two salts is 180 gram per 100 gram water. The obtained composition is then 84% $NH_4NO_3$, 16% $NH_4Cl$ in 54% water. Another mixture that offers greater solubility is a mixture of $NH_4NO_3$ with sodium nitrate. At 0° C 62% $NH_4NO_3$ and 38% sodium nitrate + 58 gram water are the optimum relationship. The solubility of $NH_4NO_3$ has been increased from 118 gram per 100 gram water to a combined 171.5 gram with 100 gram water. Tests have been conducted with 84 gram $NH_4NO_3$ + 16 gram $NH_4Cl$ mixture of dry salts, to which water has been added. The results are shown in Table III.

TABLE III

Test in insulated cup, 84 g $NH_4NO_3$ + 16 $NH_4Cl$

| | Water g | Temp °C | $\Delta T$ °C | Wt × $\Delta T$ g × °C | Cal/g Cp = 1 | Heat to evaporate water cal | Cal of cooling Cal for $H_2O$ evap. COP | Btu lb Cp = 1 |
|---|---|---|---|---|---|---|---|---|
| | 0 | 20 | Start | | | | | |
| | 25 | 0 | 20 | 2500 | 25.0 | 135 | 0.185 | 45 |
| | 30 | −2 | 22 | 2860 | 28.6 | 162 | 0.176 | 51.5 |
| | 40 | −5 | 25 | 3500 | 35.0 | 216 | 0.162 | 63 |
| | 50 | −7 | 27 | 4050 | 40.5 | 270 | 0.150 | 73 |
| nearly | 60 | −9 | 29 | 4650 | 46.5 | 324 | 0.143 | 84 |
| dissolv. | 70 | −10 | 30 | 5100 | 51 | 378 | 0.135 | 92 |
| slight | 80 | −10.5 | 30.5 | 5500 | 55 | 432 | 0.127 | 99 |
| sed. | 90 | −11 | 31 | 5900 | 59 | 486 | 0.121 | 106 |
| All clear | 100 | −11 | 31 | 6200 | 62 | 540 | 0.115 | 112 |
| | 110 | −9 | 29 | 6100 | 61 | 594 | 0.103 | 110 |

As shown in the preceding table, the mixture of 100 grams of salt is efffectively soluble in 40 grams of water. The increased solubility produces cooling with much less water and, therefore, less water has to be evaporated, resulting in a higher C.O.P.

Reference is made to the drawing which diagrammatically illustrates one example of this invention. The air in building 1 is withdrawn by blower 2 and passed through conduits 3 to valves 4 and 5. Valve 4 is adjusted to permit the air to pass through conduit 6 into cooler 8 where it passes over the cooled salt solution 12 and exits through conduit 14, valve 17 and conduits 16 and 19 to return as cold air to building 1. While this cooling is taking place using cooler 8, cooler 9 is being prepared by evaporation of water from the salt solution and forming of the salt by the following procedure. Blower 20 blows atmospheric air through a solar heat collector 21 and conduits 22 to valves 4 and 5. Valve 5 is adjusted so that the hot air is passed over the salt solution 13 in cooler 9 to evaporate the water and return the salts to its crystal state. The resulting humid air is exhausted to the atmosphere via conduit 15 valve 18 and conduit 23.

When the salts in cooler 9 have been dried valves 4 and 17 are rotated 45° clockwise and valves 5 and 18 rotated 45° counter clockwise. A predetermined amount of water from 10 is added to the dried salts in cooler 9 through sprays 11 to form a cool solution. With the valves so adjusted the air from the building will pass through conduit over the cool solution and will be returned to the building via conduit 19 as cool air. While the solar heated air will pass through conduit 6 over the salt solution 12 in cooler 8 and be vented through conduit 14 valve 17 and conduit 24 to the atmosphere.

Adjustments in the cu. ft. per hr. of the air circulating from the building and the solar heated air should be made so that dried salt will be formed for reuse in one cooler at about the same time that the coolness is depleted in the other cooler.

The system with slight change could be made to operate with three or more coolers acting, in turn, as coolers or four or more acting as pairs for any given function.

Variation of the cooling system can also be made so that the air to be cooled will pass through the solution as well as over it. The cold solution may be passed into a heat exchange apparatus for cooling the air and removed during the salt recovery and water evaporation step. With this latter variation a continuous process could be used where the cold solution as prepared is continually fed into one end of the heat exchanger and the solution with the potential cooling effect exhaust withdrawn from the other end and passed through an evaporation system in a continuous manner to provide salt crystals for reuse.

The water can be sprayed onto:
 a. A metal or plastic tray with thin salt layer, or
 b. A tray with porous cover over the salt layer.

The porous cover can be made of plastic sponge which should be resistant to the chemicals and to temperatures to be encountered. The porous cover may be covered with a high water permeable thin film to eliminate the possibility of salts or salt spray contaminating the air. The porous material can be made of a metallic mesh-life material to increase thermal conductivity and heat transfer cooling.

Another modification of the invention that would avoid the possibility of the salts dusting or salt sprays contaminating the air would include covering the salt with a membrane that is water vapor permeable but not permeable to liquid water or salts dissolved in water, or dry salt particles. The membrane could be in the shape of a bag and the salt introduced into the bag as the salt solution in water admixed with a sponge-like material to distribute the salt evenly when it is dry. In this modification the bag can be quilted to prevent bulging as the water enters through tubes for the purpose of dissolving the dry salt.

Suitable materials, that can be used as membranes, are well known in the art and have been used for raincoats, exposure suits, etc. An example of such sheet material is the 45–55 blend of butadiene-acrylonitrile copolymer and polyvinyl chloride described in an article by D. Satas, "Porous Sprayed Sheets and Coatings" Industrial and Engineering Chemistry Vol. 57, No. 4 (April 1965) pp. 38–42. Another suitable material is available under the name "Vapotex" from Aldan Rubber Company of Philadelphia, Pa.

The following are design calculations for air conditioning a building, when assuming that the cooling need is 200,000 Btu daily, or 3 tons for 5.5 hours. Using ambient air at 90° F wet bulb, the heat content of 1.0 lb. air and vapor to saturate it is the following:

| | | |
|---|---|---|
| At 90° F WB | 34.5 Btu Vapor | 55.75 Btu total |
| 130° F WB | 123.9 Btu Vapor | 155.1 Btu total |
| Difference | 89.75 Btu Vapor | 99.35 Btu total |

That is, about 90 Btu is available to evaporate water from trays, to dry salts per each lb of air circulated.

The following calculations are based on two different ratios of pounds of water per pound of salt:

| lb. Salt | lb. Water | | |
|---|---|---|---|
| 1.0 | 0.3 | 0.6 | |
| Heat of evaporation, Btu | 300 | 600 | |
| If 1.0 lb air removes 90 Btu, the air needed, lb | 3.3 | 6.7 | |
| Volume of 130° F air, ft³ (density 17.4 ft³/lb | 58 | 116 | (ft³ 130° F air/lb salt) |
| Assuming that COP = 0.1: 1 lb. salt produces 100 Btu cooling, requiring 2,000 lb. salt. | | | |
| dissolved in water, lb. | 600 | 1200 | |
| dissolved in water, gallon | 72 | 144 | |
| Total air at 130°F circulated, ft | 116,000 | 232,000 | |
| Assuming that air | | | |

| | -continued | |
|---|---|---|
| lb. Salt | lb. Water | |
| 1.0 | 0.3 | 0.6 |
| is circulated for 5.5 hrs. air flow rate is ft³/hr | 21,000 | 42,000 |
| or air flow, cfm | 350 | 700 |

If two ducts are used to switch the air-flow and water spray in alternate sequences, the above amounts should be doubled, but if the sequences are switched every hour the required salt weight can be reduced in proportion. Hence the amount of water is not excessive.

Total air circulation in the above described case is computed at 116,000 or 232,000 cubic foot, supplying 300,000 to 600,000 Btu during 5.5 hours to evaporate water. The hourly heating rate will be 55,000 to 110,000 Btu. During summer months a simple air heater can be operated with solar energy at 50% efficiency to produce warmed air at 130° F (or even higher temperature). On clear days a net gain of more than 1000 Btu/ft² daily can be achieved. The collector area therefore is calculated as 55 to 110 ft², an area easily accomodated on the roof of a building, facing approximately South, with a slight tilt to the horizontal.

It is obvious that many variations can be made without departing from the spirit of the invention.

I claim:

1. The method for air conditioning buildings which comprises dissolving in water a salt having an endothermic heat of solution, to create a cold solution, passing air in heat exchange relationship with said cold solution to cool the air for introduction into said building, recovering the salt for reuse by evaporation of the water from the solution with hot air, the heating of the air being at least partly provided by solar heat.

2. The method of claim 1 wherein the air to be cooled is air from the building and the cooler air is returned to said building.

3. The method of claim 1 wherein the recovery of the salt from solution is carried out after the potential cooling effect is exhausted.

4. The method of claim 1 wherein the air to be cooled is passed over a body of the cold solution.

5. The method of claim 2 wherein the air to be cooled is passed in heat exchange relationship with but out of contact with the cold solution and the cold solution passes countercurrent to the flow of air in a continuous manner, and at a rate so that the potential cooling effect is exhausted as it leaves the cooler.

6. The method of claim 5 wherein the cooling solution leaving the cooler is passed into a continuous process for evaporating the water and recovering the salt for reuse.

* * * * *